(12) United States Patent
Horne et al.

(10) Patent No.: US 7,272,124 B1
(45) Date of Patent: Sep. 18, 2007

(54) ACQUISITION OF A SYNCHRONOUS CDMA TDD QPSK WAVEFORM USING POWER AND TIMING ESTIMATES

(75) Inventors: Lyman D. Horne, Salt Lake City, UT (US); Brad Hansen, Salt Lake City, UT (US); Delon Jones, West Bountiful, UT (US)

(73) Assignee: L-3 Communications Corporation, New York, NY (US)

( * ) Notice: Subject to any disclaimer, the term of this patent is extended or adjusted under 35 U.S.C. 154(b) by 1068 days.

(21) Appl. No.: 10/284,536

(22) Filed: Oct. 30, 2002

(51) Int. Cl.
*H04B 7/216* (2006.01)
(52) U.S. Cl. ............... 370/335; 370/252; 370/342; 370/503; 375/150; 375/149
(58) Field of Classification Search ............... None
See application file for complete search history.

(56) References Cited

U.S. PATENT DOCUMENTS 5,099,493 A * 3/1992 Zeger et al. ............ 370/342
6,570,842 B1 * 5/2003 Landolsi ............. 370/210
6,898,197 B1 * 5/2005 Lavean ............ 370/335
7,133,440 B1 * 11/2006 Horne et al. ........... 375/150

\* cited by examiner

*Primary Examiner*—Duc Ho
(74) *Attorney, Agent, or Firm*—Harrington & Smith, PC

(57) ABSTRACT

A method and system for using power and timing estimates to acquire frame acquisition of a reverse CDMA carrier signal. The method includes providing at least one remote transceiver device acquiring a forward CDMA carrier signal, and the one remote transceiver device transmitting a reverse CDMA carrier signal modified to include a frequency associated with the forward CDMA carrier signal. A transceiver base station, in response to determining if the reverse CDMA carrier signal exceeds a reverse CDMA carrier signal threshold (RCCST), uses the frequency embedded in the modified reverse CDMA carrier signal to acquire phase of the reverse CDMA carrier signal. Achieving acquisition the transceiver base station signals a mode change to the remote transceiver. Otherwise, the transceiver base station signals the remote transceiver device to slip the reverse CDMA carrier signal a predetermined number of chips; and/or transmit the reverse CDMA carrier signal at a second power level.

31 Claims, 14 Drawing Sheets

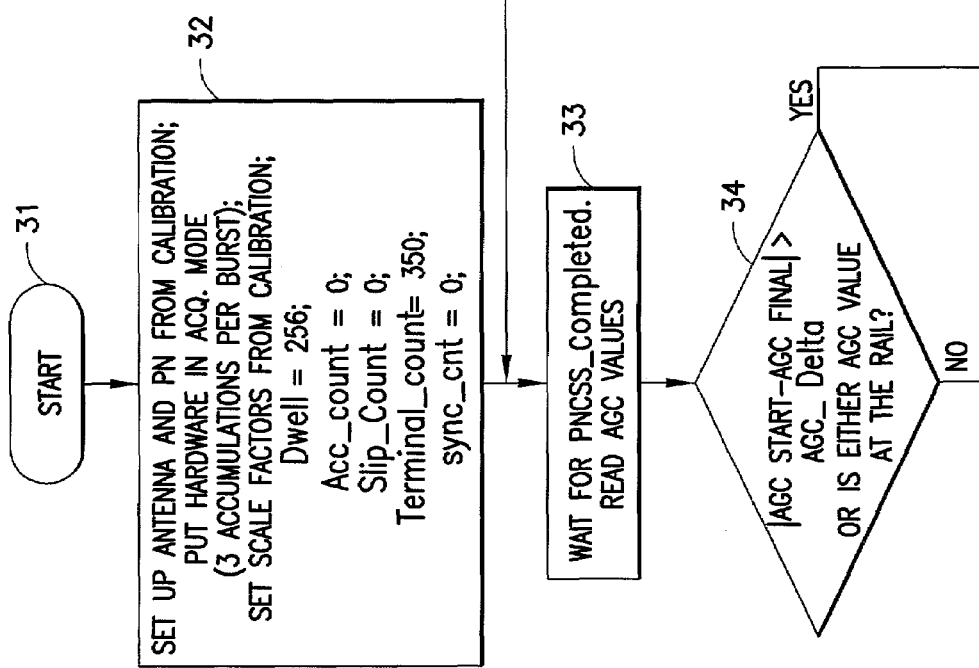

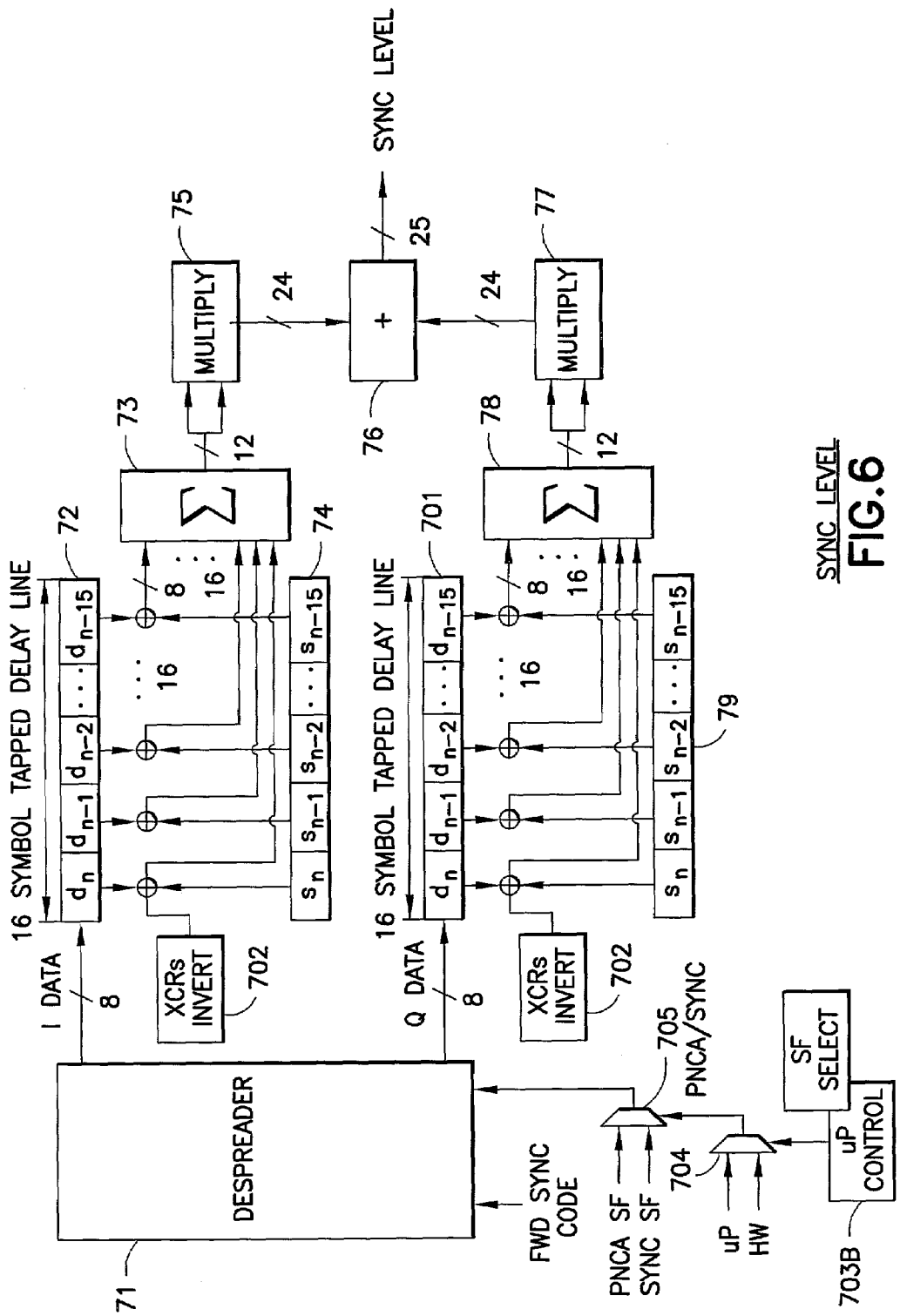

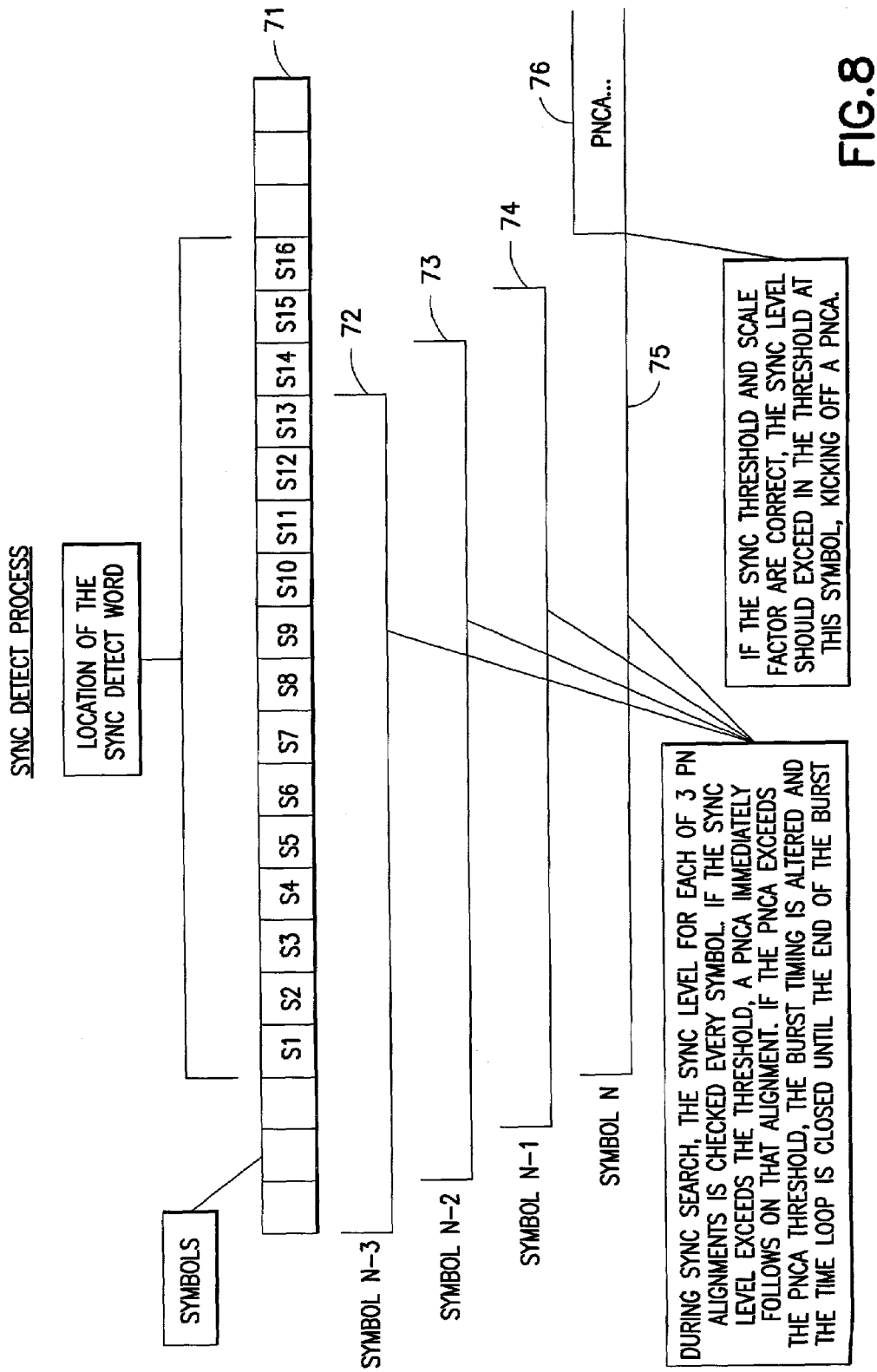

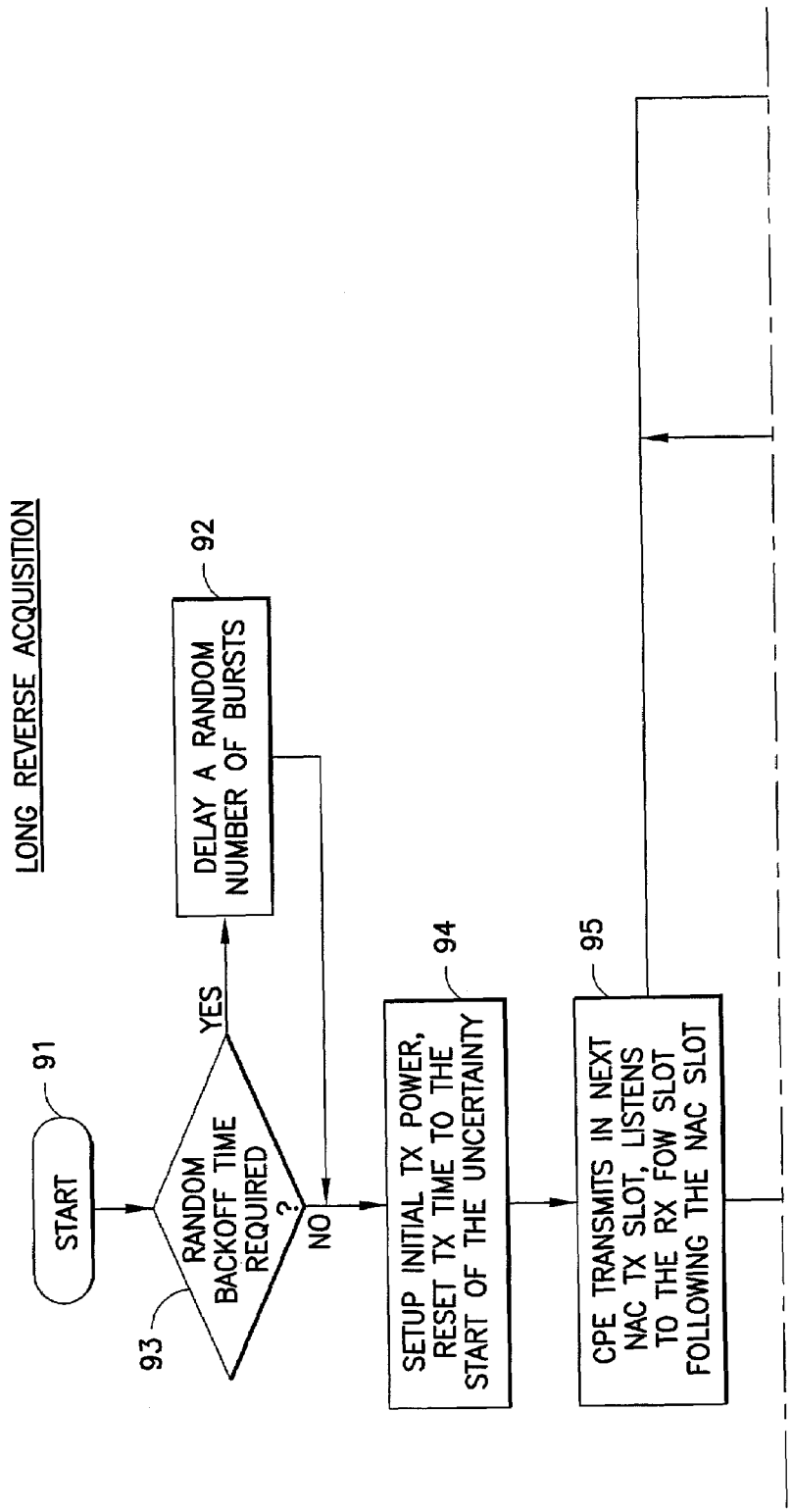

ACQUISITION OF A SYNCHRONOUS CDMA TDD QPSK WAVEFORM USING POWER AND TIMING ESTIMATES

BACKGROUND OF THE INVENTION

1. Field of the Invention

The present invention relates to spread spectrum communication systems using PN coding techniques and, more particularly, to acquiring a phase of the PN code.

2. Prior Art

Spread spectrum (SS) systems, which may be CDMA systems, are well known in the art. SS systems can employ a transmission technique in which a pseudo-noise (PN) PN-code is used as a modulating waveform to spread the signal energy over a bandwidth much greater than the signal information bandwidth. At the receiver the signal is despread using a synchronized replica of the PN-code.

There are, in general, two basic types of SS systems: direct sequence spread spectrum systems (DSSS) and frequency hop spread spectrum systems (FHSS).

The DSSS systems spread the signal over a bandwidth $f_{RF} \pm R_c$, where $f_{RF}$ represents the center bandpass carrier frequency and $R_c$ represents the PN-code maximum chip rate, which in turn is an integer multiple of the symbol rate $R_s$. Multiple access systems employ DSSS techniques when transmitting multiple channels over the same frequency bandwidth to multiple receivers, each receiver having its own designated PN-code. Although each receiver receives the entire frequency bandwidth only the signal with the receiver's matching PN-code will appear intelligible, the rest appears as noise that is easily filtered. These systems are well known in the art and need not be discussed further.

As noted, the DSSS system PN-code sequence spreads the data signal over the available bandwidth such that the carrier appears to be noise-like and random to a receiver not using the same PN-code.

In communication systems having multiple central base stations or network access points (APs) and multiple remote transceiver devices or consumer premise equipment (CPE), e.g., fixed or mobile units. The CPE may receive and decode signals transmitted by each of the APs. It will be appreciated that in burst communication systems it is desirable to provide a method and system for an AP to quickly reverse synchronize with multiple transmitting CPEs operating at the lowest individual CPE power.

SUMMARY OF THE INVENTION

The foregoing and other problems are overcome, and other advantages are realized, in accordance with the presently preferred embodiments of these teachings.

In accordance with one embodiment of the present invention a method for using power and timing estimates to acquire frame acquisition of a reverse CDMA carrier signal is provided. The method includes the steps of providing at least one remote transceiver device acquiring a forward CDMA carrier signal, and the one remote transceiver device transmitting a reverse CDMA carrier signal modified to include a frequency associated with the forward CDMA carrier signal. A transceiver base station, in response to determining if the reverse CDMA carrier signal exceeds a reverse CDMA carrier signal threshold (RCCST), uses the frequency embedded in the modified reverse CDMA carrier signal to acquire phase of the reverse CDMA carrier signal. After acquisition the transceiver base station signals the remote transceiver device to enter a predetermined mode. In response to determining the reverse CDMA does not exceed the RCCST, then the transceiver base station signals the remote transceiver device to slip the reverse CDMA carrier signal a predetermined number of chips; and/or transmit the reverse CDMA carrier signal at a second power level.

In accordance with another embodiment of the present invention a system for acquisition of a reverse CDMA waveform is provided. The system includes a remote transceiver device having two receiver antennas for receiving a forward CDMA waveform and a receiver correlator for correlation of the forward CDMA waveform during one of at least three equally spaced accumulation periods. The system also includes a receiver frame synchronizer for synchronizing with the forward CDMA waveform and a preamble modifier for modifying a preamble associated with the reverse CDMA waveform to include a frequency of the forward CDMA waveform acquired by the remote transceiver device. In addition, the system includes a transceiver base station having a transmitter calibrator for determining a CDMA carrier signal threshold and a transmitter parallel correlator for searching for the reverse CDMA waveform exceeding the CDMA carrier signal threshold. The transceiver base station includes a transmitter frame synchronizer for synchronizing with the reverse CDMA waveform exceeding the CDMA carrier signal threshold. The transmitter frame synchronizer includes a transmitter phase tracking loop adapted to loading the frequency of the forward CDMA waveform from the modified preamble for quickly determining a phase of the reverse CDMA waveform.

The invention is also directed towards a system for acquisition of a reverse CDMA waveform, the system including a receiver for acquiring a forward CDMA waveform and a transmitter for transmitting the forward CDMA waveform. The transmitter includes a pseudo-noise (PN) correlation accumulator (PNCA) controller for determining a first PNCA threshold from the reverse CDMA waveform and a sync controller for determining a sync threshold associated with the reverse CDMA waveform. The transmitter uses the first PNCA threshold and the first sync threshold to search for a burst sync associated with the reverse CDMA waveform. The transmitter also includes phase tracking loop for determining the reverse CDMA waveform phase, wherein the phase tracking loop is adapted to include a frequency of the forward CDMA waveform acquired by the receiver and stored in the reverse CDMA waveform.

In accordance with another embodiment of the invention a method for closed-loop acquisition of a reverse CDMA signal is provided. The method includes the steps of modifying a preamble associated with the reverse CDMA signal to include a frequency associated with the forward CDMA signal and initializing a remote transceiver transmit power and transmit time. A base station receiving the reverse CDMA signal loads the frequency associated with the forward CDMA signal from the modified reverse CDMA signal into a phase detector. The phase detector then quickly determines a phase associated with the reverse CDMA signal and acquires the reverse CDMA signal.

BRIEF DESCRIPTION OF THE DRAWINGS

The foregoing aspects and other features of the present invention are explained in the following description, taken in connection with the accompanying drawings, wherein:

FIG. 6 is a block diagram of a sync level detection circuit incorporating features of the present invention shown in FIG. 1;

FIG. 8 is a pictorial diagram illustrating the location of a sync detect word in a forward CDMA signal and the process for detecting the sync detect word shown in FIG. 5;

DETAILED DESCRIPTION OF THE PREFERRED EMBODIMENT

Figure 1:
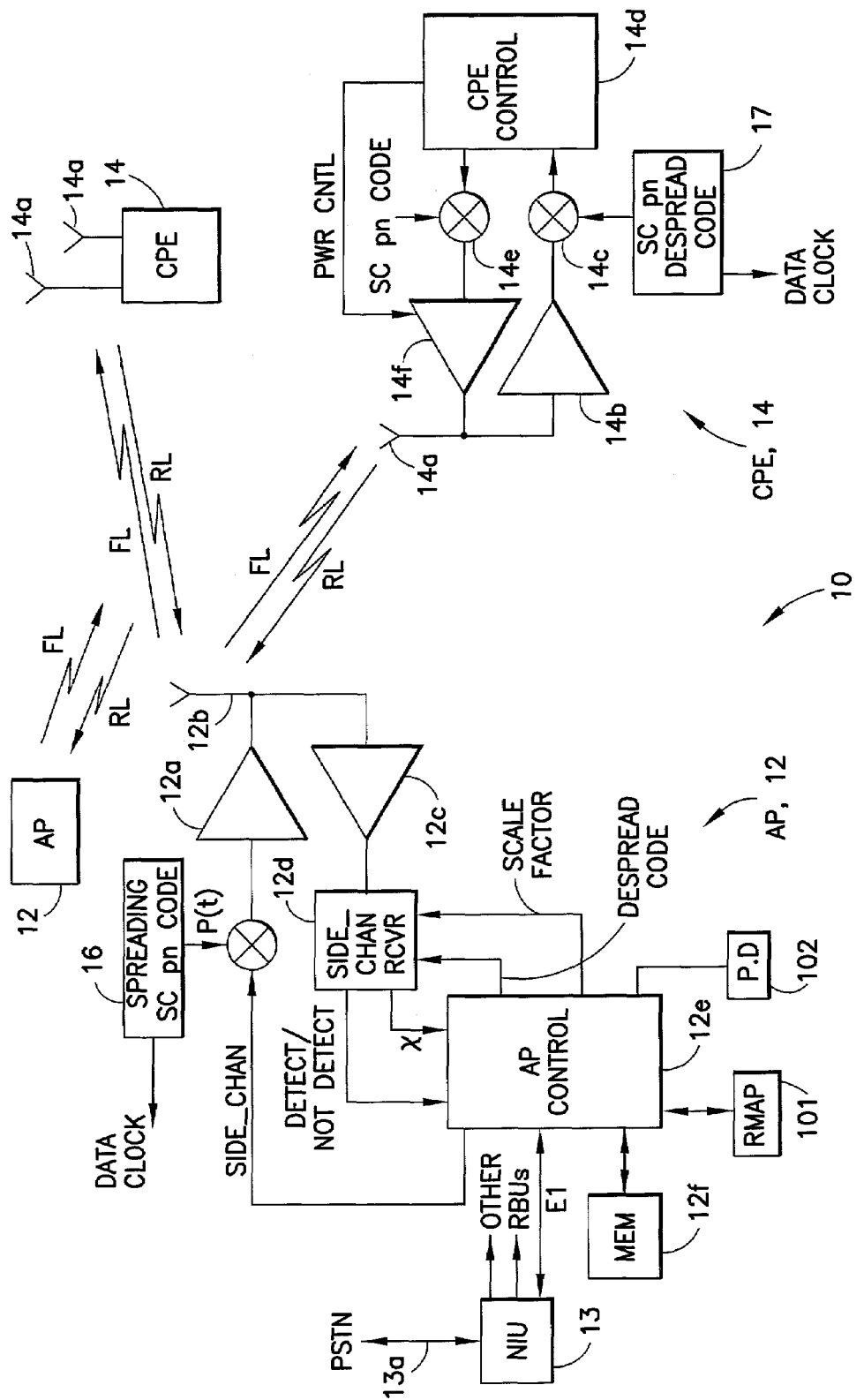
FIG. 1 is a block diagram of a communications system incorporating features of the present invention.

Referring to FIG. 1, there is shown a pictorial diagram of a multi-user telecommunications system incorporating features of the present invention. Although the present invention will be described with reference to the embodiment shown in the drawings, it should be understood that the present invention might be embodied in many alternate forms of embodiments.

Still referring to FIG. 1 there is shown a Fixed Wireless System (FWS) 10 that is suitable for practicing this invention. Specifically, the FWS 10 employs direct sequence spread spectrum based CDMA techniques over an air link to provide local access to subscribers, and offers very high quality, highly reliable service. The FWS 10 is a synchronous CDMA (S-CDMA) communications system wherein forward link (FL) transmissions from a base station, referred to also as an access point (AP) 12, for a plurality of transceiver units, referred to herein as user or consumer premise equipment (CPE) 14, which may be symbol and chip aligned in time, and wherein the CPE 14 operates to receive on one of at least two antennas 14a the FL transmissions and to synchronize to one of the transmissions. It will be appreciated that for clarity only one antenna is shown in the detailed block diagram in FIG. 1 but it is to be understood that at least two receiver antennas are in the CPE as shown in the high level single CPE block 14 shown in FIG. 1. While not necessary for the present invention, each CPE 14 may also transmit a signal on a reverse link (RL) to AP 12 to generally perform bi-directional communications. The FWS 10 is suitable for use in implementing a telecommunications system that conveys multirate voice and/or data between the AP 12 and the CPEs 14.

The AP 12, includes circuitry for generating a plurality of user signals ($USER_1$ to $USER_n$), which are not shown in FIG. 1, and a synchronous side channel ($SIDE_{Chan}$) signal that is continuously transmitted. Each of these signals is assigned a respective PN spreading code and is modulated therewith before being applied to a transmitter 12a having an antenna 12b. In the preferred embodiment there is at least one antenna per AP sector. When transmitted on the FL the transmissions are modulated in phase quadrature, and the CPEs 14 are assumed to include suitable phase demodulators for deriving in-phase (I) and quadrature (Q) components there from. The AP 12 is capable of transmitting a plurality of frequency channels.

The AP 12 also includes a receiver 12c having an output coupled to a side channel receiver 12d. The side channel receiver 12d receives as inputs the spread signal from the receiver 12c, a scale factor signal, and a side channel despread PN code. These latter two signals are sourced from a AP processor or controller 12e. The scale factor signal can be fixed, or can be made adaptive as a function of the number of CPEs 14 that are transmitting on the reverse channel. The side channel receiver 12d outputs a detect/not detect signal to the AP controller 12e for indicating a detection or forward acquisition of a transmission from one of the CPEs 14, and may also generate a power estimate value.

Figure 2:
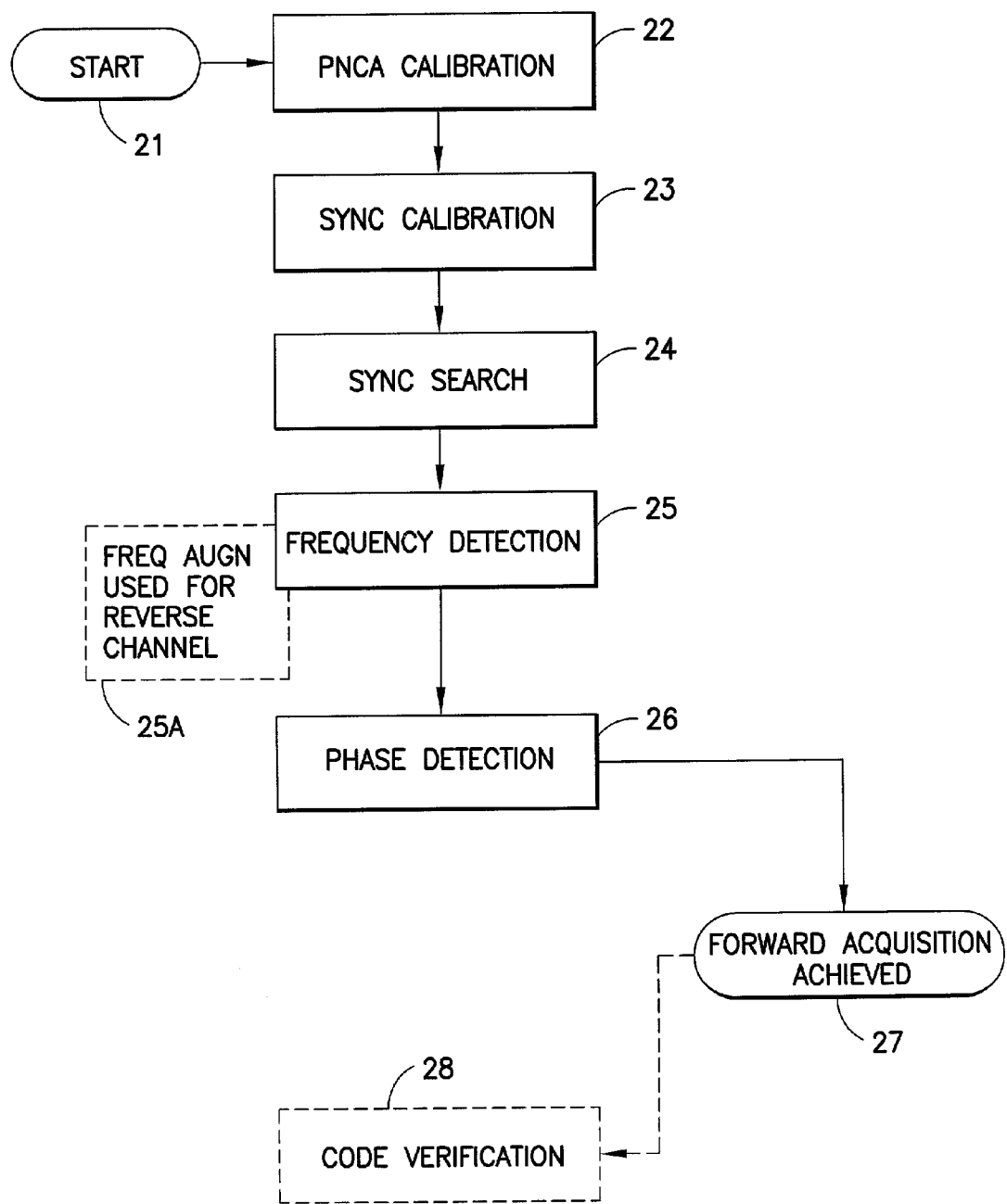
FIG. 2 is a method flow chart illustrating the steps for implementing forward CDMA signal acquisition in accordance with the present invention.

Referring to FIG. 2, in accordance with the present invention, forward acquisition includes the steps of PN correlation accumulator (PNCA) calibration, step 22. PNCA calibration identifies an antenna (FIG. 1, item 14a) and forward sync code (FSC) combination with energy above a predetermined threshold to be used throughout the forward signal acquisition, adjusts PNCA scale factors, and calculates a PNCA threshold required for sync search. In addition, PNCA calibration, step 22, determines an initial sync scale factor to be used in sync calibration. A variable length list of PN codes to be searched is preferably provided before PNCA calibration. This list of PN codes is searched, and the code with the energy above a predetermined level may be used for the remainder of forward acquisition. The length of the code list can be as small as 1 and, in alternate embodiments, as large as, for example, 57, or the total number of FSCs. In the preferred embodiment, the length of the list will be 1.

Sync calibration, step 23, adjusts the initial sync scale factor and calculates a sync threshold required for sync search, step 24. Sync search 24 aligns the CPE burst timing with the received signal using embedded sync bits and verifies it with the PNCA threshold (see FIG. 5). After burst timing is determined, frequency detection, step 25, estimates In Phase (I) and Quadrature phase (Q) rotation rate. This operation may include loading the frequency alignment information recovered from the forward link into the reverse link, as shown in optional Step 25A of FIG. 2. In the reverse ACK case, however, this procedure is preferably implemented (see the description of FIG. 9).

Phase detection, step 26 then determines I-Q phase error. In alternate embodiments, code detection and verification, step 28, may be used to verify forward acquisition. In the alternate embodiment, forward acquisition is verified by decoding a forward error correction coded sync code (FEC). In the preferred embodiment the FEC code used is the Reed Solomon FEC.

Figure 4:
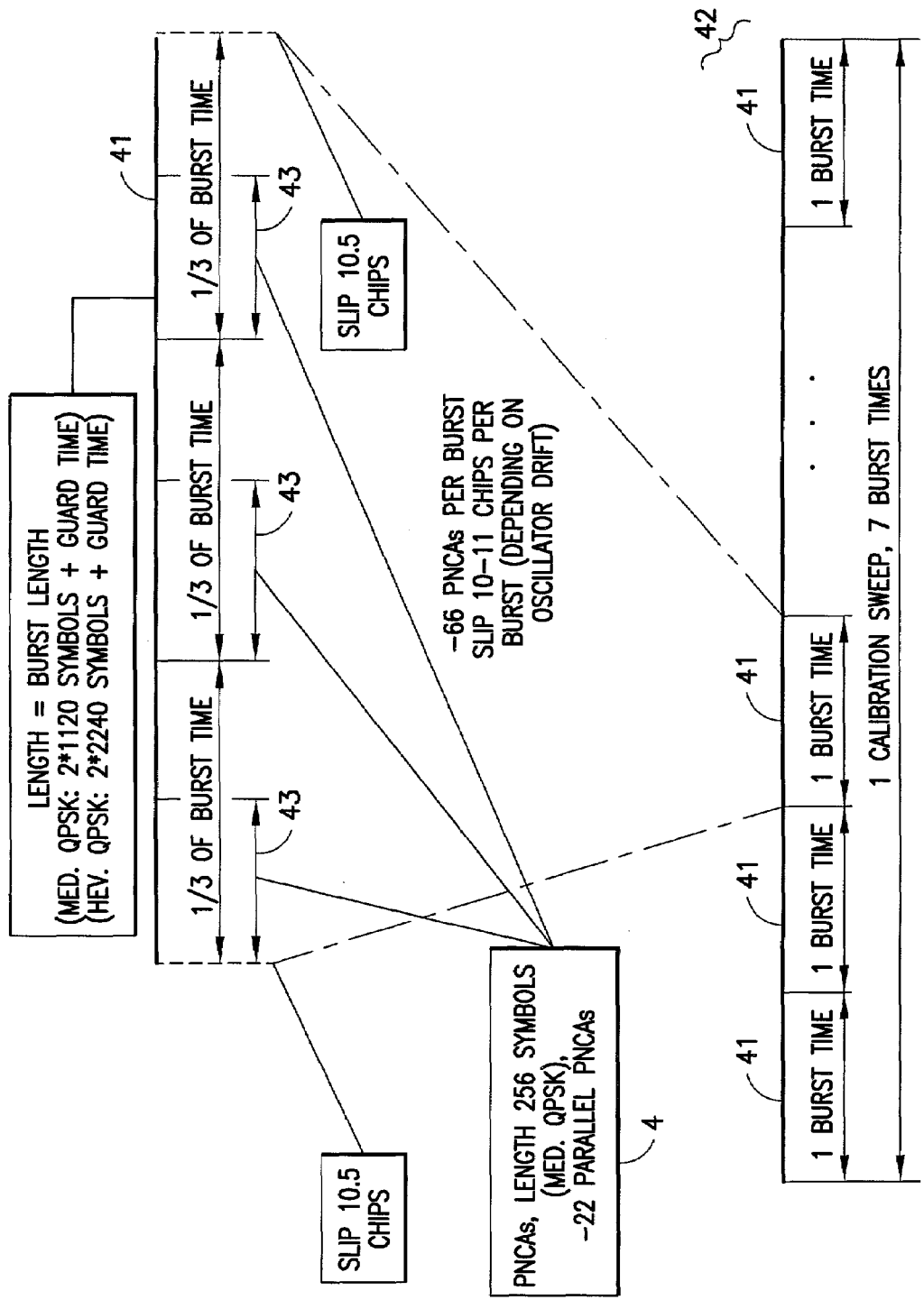
FIG. 4 is a pictorial diagram of a forward CDMA signal incorporating features of the present invention.
Figure 4A:
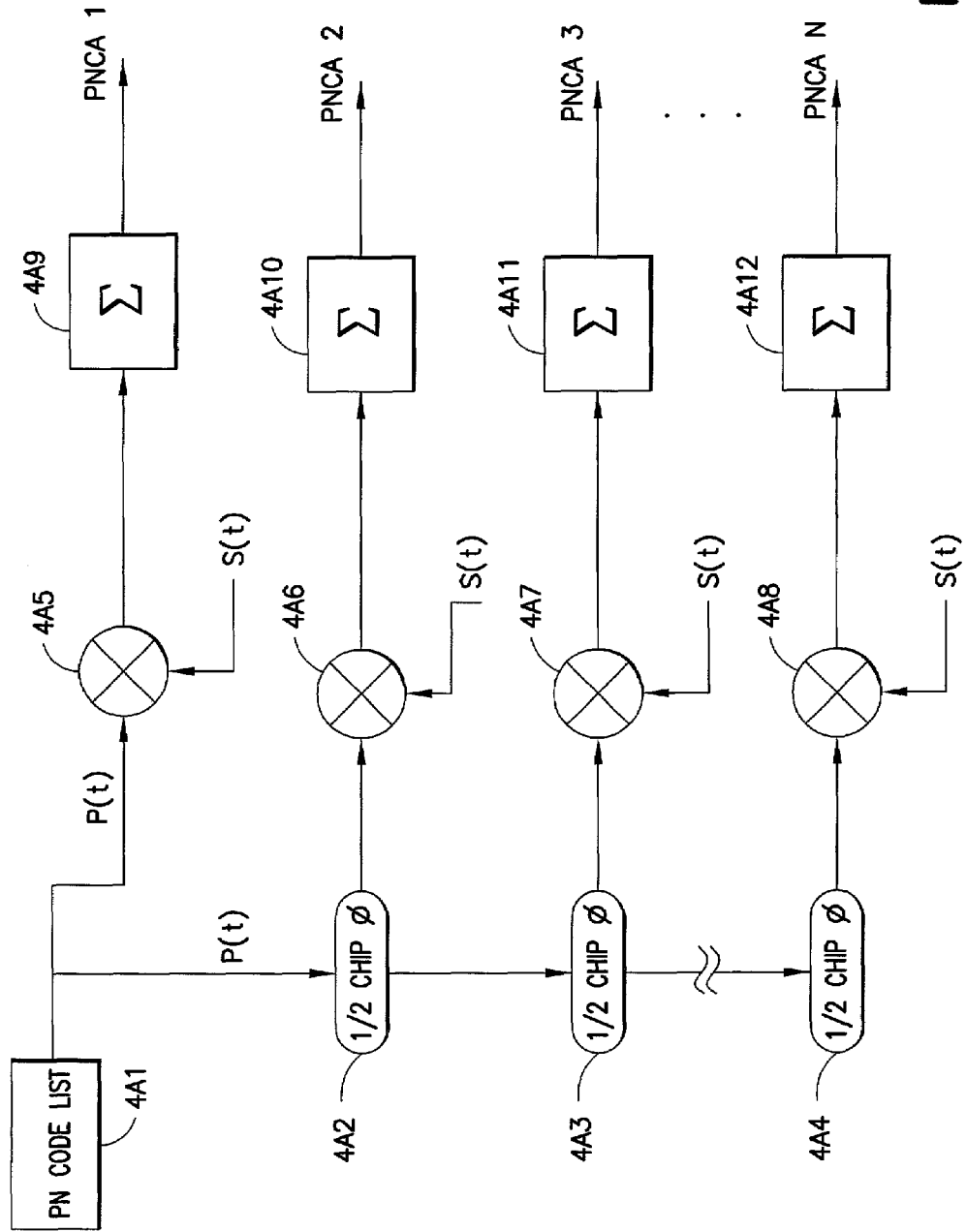
FIG. 4A is a block diagram of a N-length parallel PN correlation accumulator.

Referring to FIG. 4A, the PNCA calibration routine sweeps the entire uncertainty one code at a time from PN code list 4A1 using parallel accumulation correlators $PNCA_1 \ldots PNCA_N$; in a preferred embodiment, N=21. The signal s(t) is mixed with PN code p(t) in mixers 4A5-4A8, and accumulated in accumulators 4A9-4A12. Each successive mix and accumulation is phase delayed ½ chip by phase delayers 4A2-4A4. Thus, the signal s(t) uncertainty is swept by recording PNCAs at one PN phase alignment spanning 10 chips in a length 21 parallel correlator, then slipping 10 chips before recording more PNCAs. It will be appreciated that alternate embodiments may use any suitable parallel length correlator. This process continues until the entire signal s(t) uncertainty is swept.

For example, in a preferred embodiment, the PN code is slipped a number of half chip slips equal to the parallel length of the correlators $PNCA_1$-$PNCA_N$ minus the uncertainty that may be slipped due to oscillator drift. The oscillator (not shown) may have an overall uncertainty of ±3.5 PPM, so that 1 chip may be slipped due to oscillator drift every 285,714 chips, or ½ chip every 142857 chips, or ~2.2 ms at 66 Mcps, approximately one burst time in a preferred embodiment. Thus, the PN code is slipped 20 half chip slips (10 chips) each burst. Due to the oscillator drift, the PN code will slip between 9.5 and 10.5 chips per burst. The code uncertainty, in the preferred embodiment, is 64 chips, therefore, as shown in FIG. 4, PNCAs over 7 burst times 42 are collected to sweep the entire uncertainty. In addition, since the timing with respect to the AP 12 is unknown, during each burst time 3 equally spaced PNCAs 43 of sufficiently short length are used. This ensures that at least one of the PNCA times is completely contained within the receive time, independent of the burst timing phase.

During a PNCA calibration sweep, the PNCA scale factors are used and the PNCA scale factors are adjusted so that the highest energy signal falls within a window after scaling. The sync circuit (discussed below) is operated with the scale factors under microprocessor control (not shown) and initially set to PNCA scale factors. If at any time a PNCA is recorded with energy above the window, the PNCA scale factors are re-adjusted and the calibration sweep for that code is restarted. If, after the sweep has completed, the PNCA of largest energy is below the window, the scale factors are readjusted and the sweep is repeated.

When a calibration sweep is complete, the peak and second largest PNCAs are used to calculate the sync and PNCA thresholds that are required by the sync search.

Figure 5A:
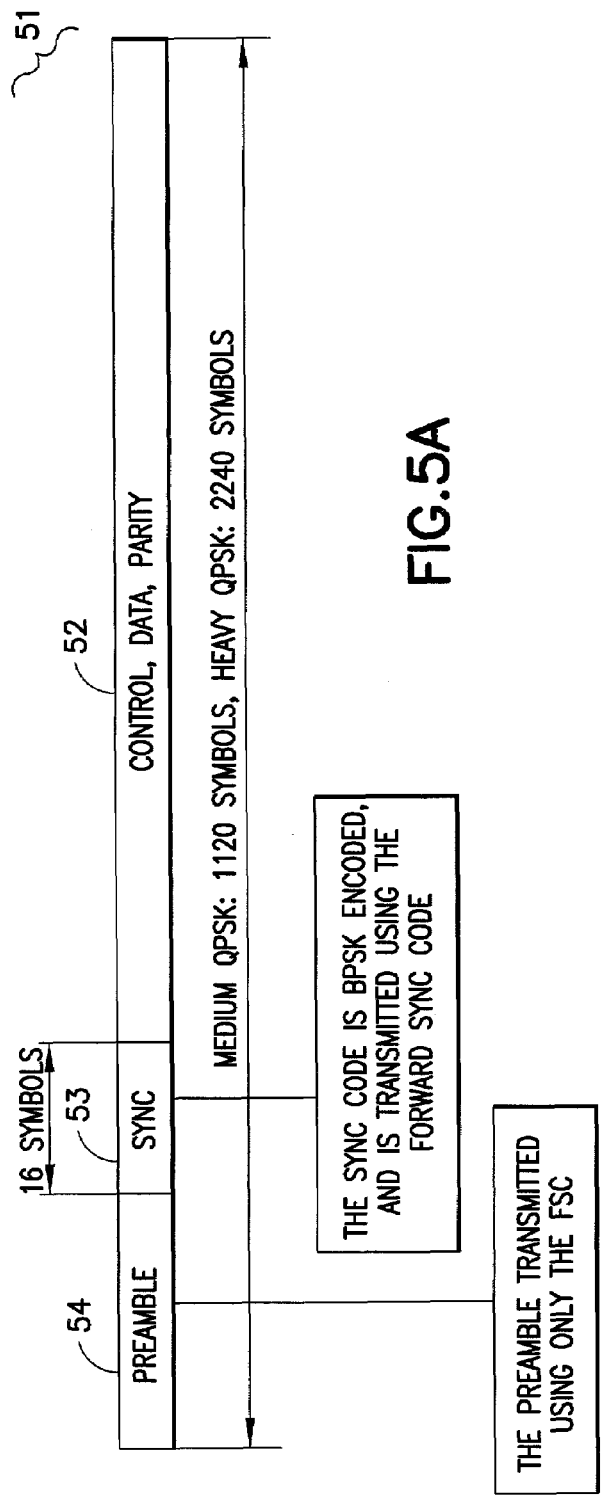
FIG. 5A is a pictorial diagram of a forward burst structure incorporating features of the present invention shown in FIG. 1.

Referring to FIG. 5, sync calibration adjusts the sync scale factors and calculates the sync threshold required for sync search for a Binary Phase Shift Keying (BPSK) encoded sync pattern 53 embedded in the burst signal 51, immediately following the preamble 54. It will be appreciated that the sync pattern 53, sixteen symbols in the preferred embodiment, is transmitted using only the FSC. In alternate embodiments the sync pattern can be any suitable symbol length. It will also be appreciated that the burst signal 51, including the preamble 54, the sync pattern 53, and the control, data, parity information 52 may be 1120 symbols in one embodiment or 2240 in an alternate embodiment. It will be further appreciated that the symbol length of the burst signal may be any suitable symbol length. Sync search for the sync pattern 53 preferably uses the combination of antenna and FSC determined during PNCA calibration.

A sync level circuit, such as shown in FIG. 6, is used to determine sync code alignment. For each symbol time for the I and Q signals from despreader 71, the sync code data $s_n$-$s_{n-15}$ is removed from the previous 16 symbols by 16 symbol tapped delay lines 72,74,701,79, respectively, through XOR gates 702. The soft decision data for these I and Q symbols is accumulated in accumulators 73 and 78, respectively. The accumulator values are then squared and summed by multipliers 75,77 and summer 76, to produce the sync level output. During sync calibration, the scale factors are under microprocessor control, item 703, and set to sync scale factors. An initial value for the sync scale factors is determined from the PNCA calibration.

The sync uncertainty is swept by slipping 1 chip per burst. This causes a slip of between ½ and 1½ chips per burst since the oscillator drift may be close to ½ chip per burst in either direction. In a preferred embodiment, at least 3 parallel sync level circuits (not shown), phased spaced ½ chip apart, spanning 1½ chips, may be used to determine sync levels. It will be appreciated that parallel searching over at least 1½ chips compensates for the case that the oscillator may drift in the same direction as the slip.

In general, the frequency of the slipping is the burst length plus the sync word length (in a preferred embodiment: 1120 symbols+16 symbols). The sync level circuitry is enabled so that the maximum sync level is determined. This level is then used to adjust the sync scale factors used in sync search (described below) and to determine the sync threshold for sync search.

Figure 7:
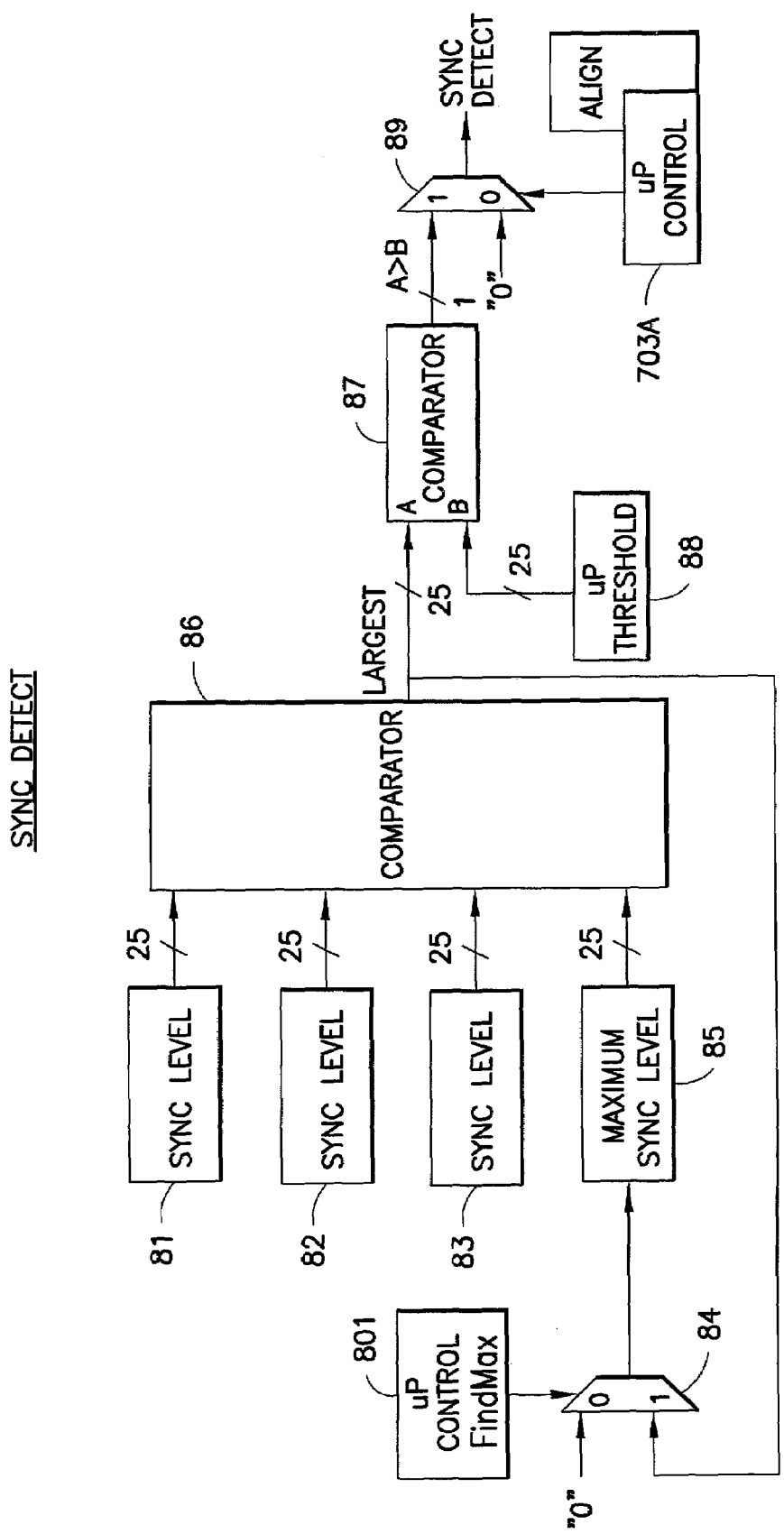
FIG. 7 is a block diagram of a sync detect circuit incorporating features of the present invention shown in FIG. 1.

Sync search aligns the burst timing to the received signal. During sync search, the FIND MAX control (FIG. 7, item 801) is reset so that the maximum sync level is not used. The ALIGN signal 703A is set so that the hardware aligns the burst timing if the sync level exceeds the threshold. The scale factor select (FIG. 6, item 703B) is set to HW control. Sync scale factors are preferably used during the sync search, and the HW preferably switches to PNCA scale factors during the PNCA that follows when sync detect occurs.

In the preferred embodiment, during sync search PN timing is slipped 1 chip per burst+16 symbols, as in sync calibration. Referring to FIG. 8, the sync level for each of the three PN alignments, space ½ chip apart, is checked every symbol for the 16 symbol sync word (only three symbol slips are shown, 72,73,74). When the sync search level exceeds the sync calibration level or threshold, the sync word 75 is detected and a length 256 PNCA follows (see FIG. 8, item 76). If this PNCA exceeds the PNCA threshold determined during PNCA calibration, the time loop is closed and the burst timing is adjusted and carrier signal frequency detection begins. In a preferred embodiment, following bursts are used to check that the sync exceeds the threshold 3 out of 5 times. If the PNCA does not exceed the threshold, the sync search continues with another burst+16 symbols without slipping.

Frequency detection estimates the I-Q rotation rate using the preamble of the detected FSC. This frequency estimate is loaded into the carrier recovery loop. Initial frequency detection estimates the I-Q rotation rate using the rest of the burst after sync detect. This is done by closing the frequency tracking loop for the rest of the burst. The frequency estimate is taken at the end of the burst and the loop is opened. This frequency estimate is loaded into the carrier recovery loop and used as the preamble of the next burst start. Because of this frequency estimate, the frequency loop will converge within a few symbols from the start of the preamble ensuring adequate time for the phase detector to converge before the preamble end.

Phase detection estimates the I-Q phase error using the preamble of the detected FSC. This is done by closing the phase tracking loop as the frequency tracking loop converges. In general, no phase data is saved from the previous burst because of channel and reference oscillator variability, therefore time for a complete phase detect is preferably allowed. In the preferred embodiment, this is possible because the frequency tracking loop has a close frequency estimate from the previous burst and converges rapidly.

Frequency tracking loops and phase detectors are well known and need not be shown or further discussed here.

Verification by the Reed Solomon decode metrics or any suitable forward error decoder metrics may be used to verify the I-Q frequency and phase match to the frequency and phase of the PN code.

Figure 3B:
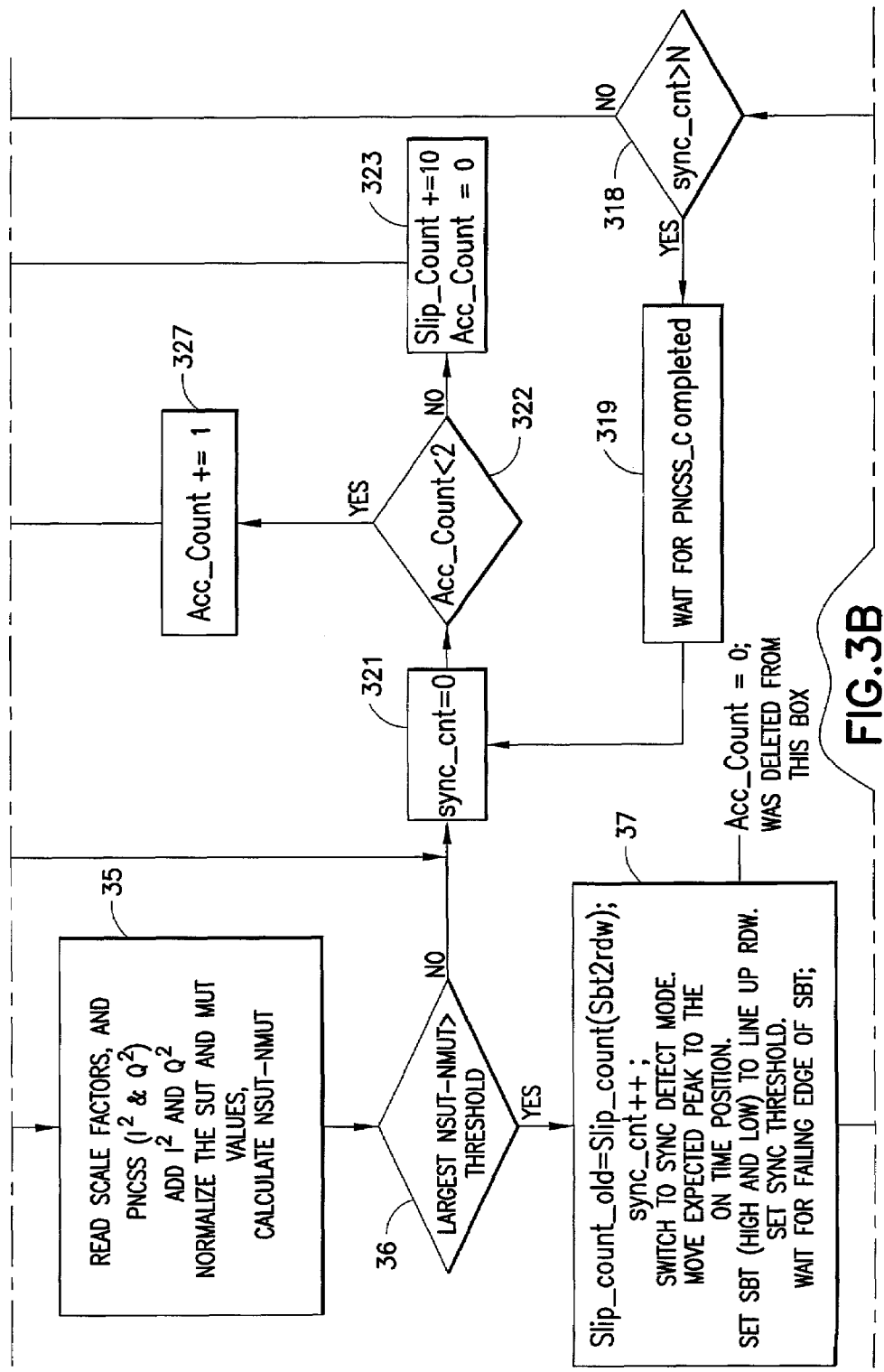
FIG. 3 is a detailed method flow chart illustrating steps for implementing another embodiment of forward CDMA signal acquisition.
Figure 3C:
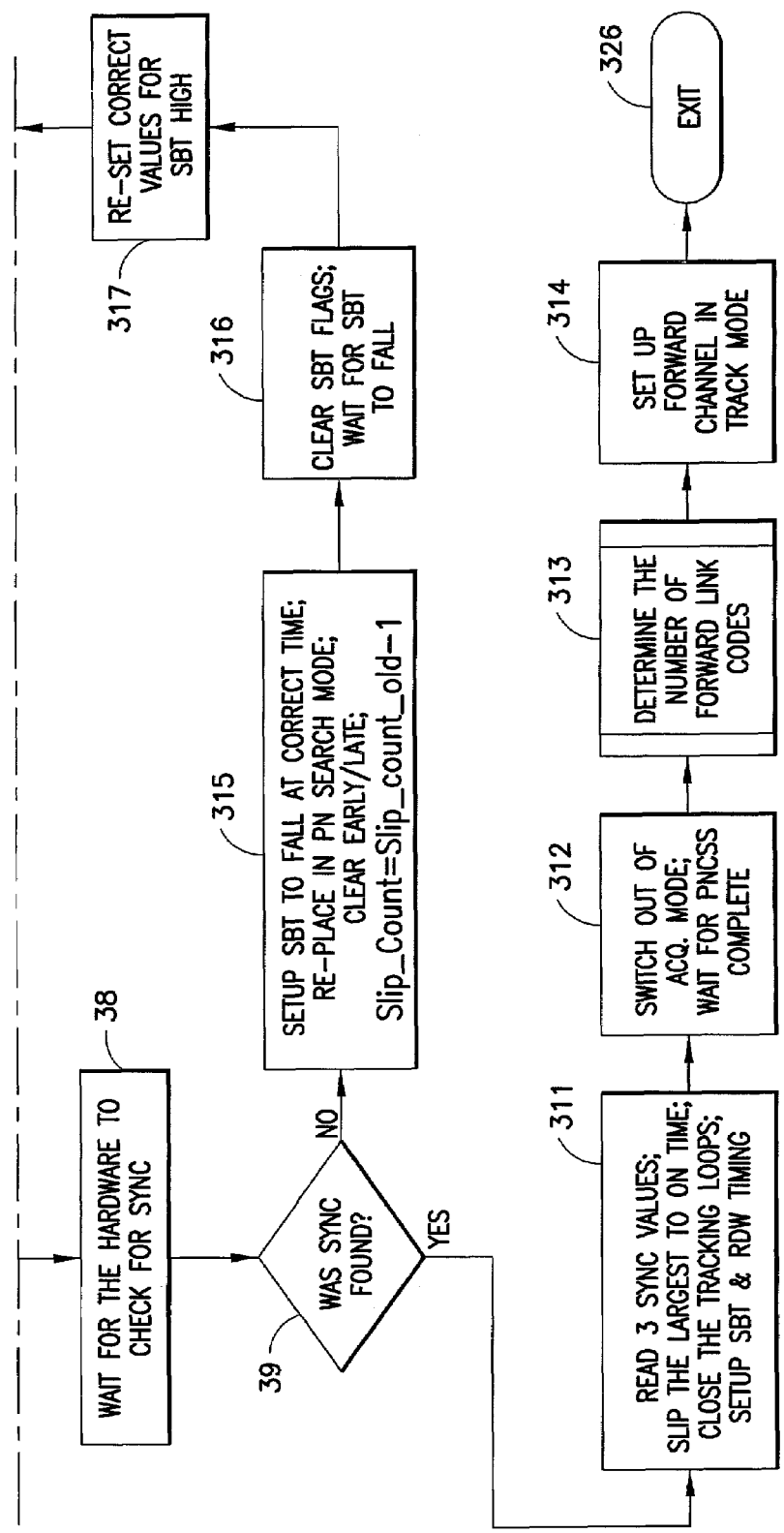

Referring now to FIG. 3 there is shown a method flow chart illustrating steps for signal acquisition in accordance with one embodiment of the present invention. Step 31 initializes any pre-acquisition steps that may be necessary, e.g., power on. Step 32 sets up antenna and PN code determined during PNCA calibration. Step 32 also puts the hardware into acquisition mode, e.g., 3 PNCA accumulations per burst and sets PNCA scale factors. Step 33 delays for PN correlation sum square (PNCSS) to complete and then reads the automatic gain control (AGC) value. Step 34 determines if the absolute value of AGC-Start minus the AGC-Final is greater than a predetermined AGC-Delta. If affirmative, step 321 sets a sync counter equal to zero and passes control to step 322. Step 322 determines if the accumulation count is less than 2. If affirmative step 327 increments the accumulation count by one and passes control to decision step 325. Decision step 325 determines if slip count is less than terminal count, initially set by step 32. If slip count is not less than terminal count then acquisition has failed and control is passed to step 324. In alternate embodiments, a failed acquisition may be handled by suitable error handling routines. Returning to step 322, if accumulation count is not below two, then step 323 increments slip count by ten and resets the accumulation count to zero. Control is then passed to step 325, discussed previously. Returning to step 34, if the result is negative, then step 35 reads scale factors and squares and sums the I and Q signals. In addition, step 35 also prepares the sync levels and sync threshold. Step 36 then compares the sync level with the sync threshold. If the sync level is below the threshold control is passed to step 321, discussed previously. If the level is above the threshold, control is passed to step 37, which switches to sync detect or sync search mode, Step 38 then waits for hardware to check for sync. If sync is found, step 39 passes control to step 311 where, in the preferred embodiment 3 sync values, ½ chip phase apart are read. The largest value is slipped to on time. Step 311 also closes the frequency tracking loop and the subsequent phase tracking loop, both of which were discussed earlier. Step 312 switches out of acquisition mode and again waits for PNCSS to complete before passing control to optional step 313 to determine the number of forward link codes. Step 314 then sets up the forward channel in track mode and passes control to step 326 for continued receiver operation. Returning to step 39, if sync is not found, steps 315-317 setup SBT to fall at correct time, clear SBT flags, and reset values for SBT high, respectively. Control is then passed to step 318 to determine if the value of sync counter is greater than a predetermined number. If affirmative, then control is passed to previously discussed step 319. If step 318 is negative then control is passed back to step 33, also discussed previously.

Figure 9B:
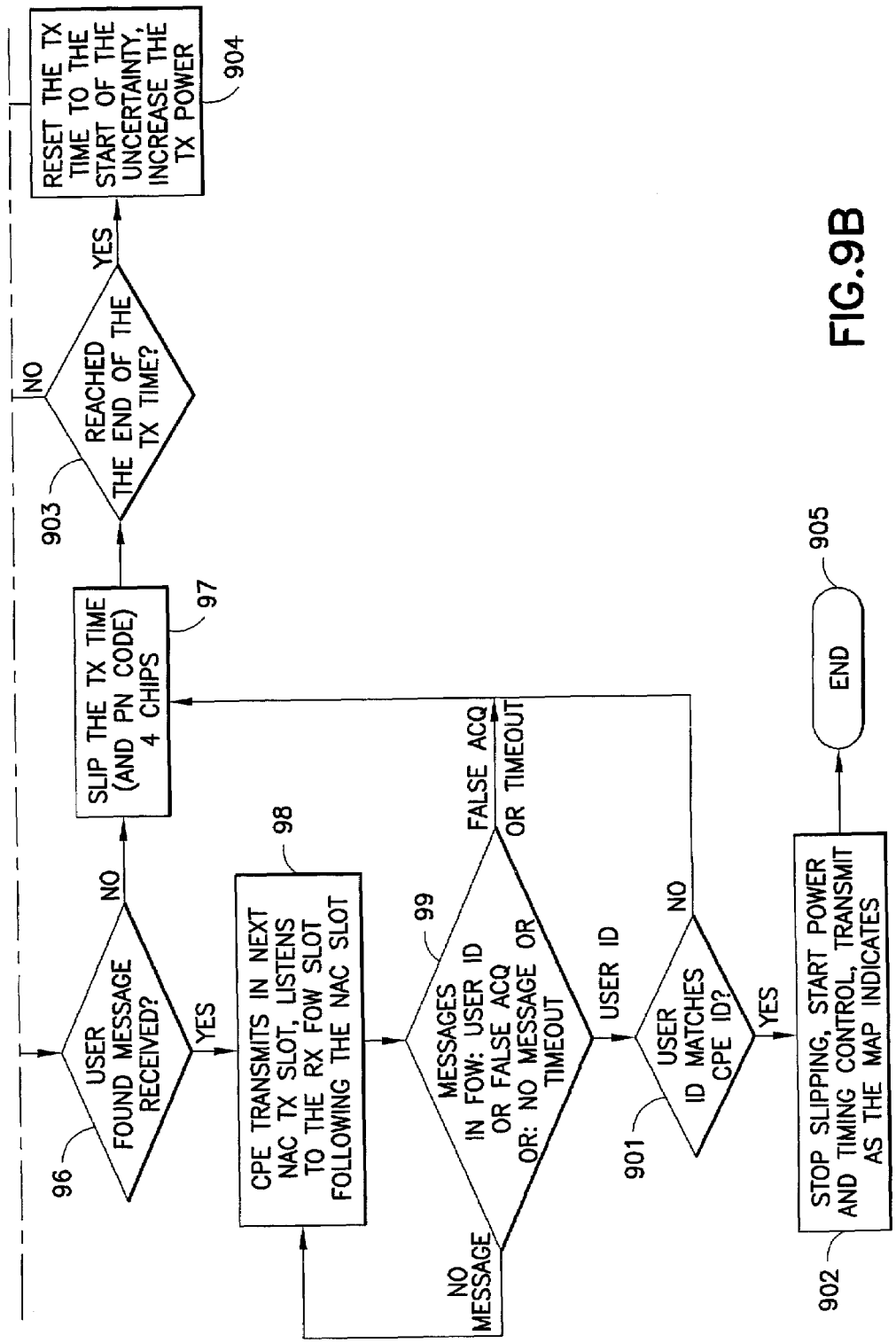
FIG. 9 is a method flow chart illustrating the CPE steps for acquisition of a reverse CDMA signal in accordance with the present invention.

Referring now to FIG. 9 there is shown a method flow chart for one implementation of the present invention. Once the CPE has acquired and is tracking the forward CDMA signal the burst timing is synchronized with the AP.

This operation preferably includes loading the frequency alignment information recovered from the forward link into the reverse link, as was mentioned previously with respect to the forward ACK process of FIG. 2.

Figure 5B:
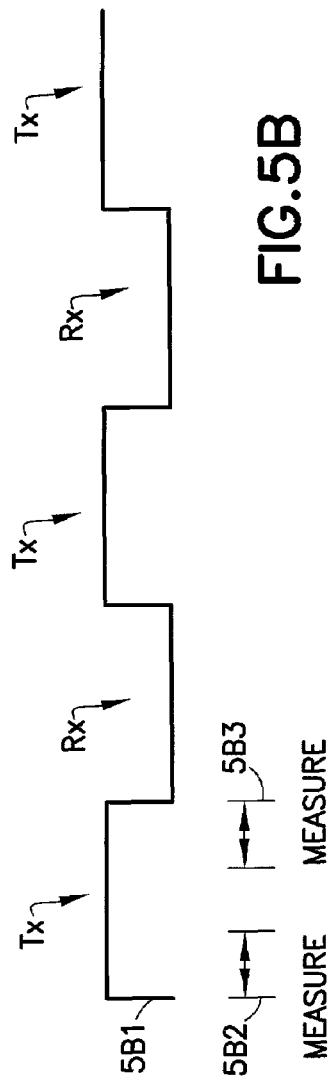
FIG. 5B is a pictorial diagram of a timing diagram incorporating features of the present invention shown in FIG. 1

Step 93 determines if a random back off time for stabilization is required. Step 92 delays processing for an arbitrarily or random number of bursts. Step 94 initializes the CPE transmit (Tx) power and resets Tx time to the beginning of an uncertainty time frame. Initial Tx power may be open loop determined from the forward CDMA signal. In addition, due to differences in distance from the AP to different CPEs there is an uncertainty time measured in PN chips. The uncertainty here may be predetermined such as a maximum uncertainty for a number of CPEs, or may be individually measured for a particular CPE. Step 95 transmits a reverse CDMA signal and listens to RX forward order wire (FOW) slot following the TX slot for a response from an AP. Step 96 determines if the AP received and decoded the reverse CDMA signal by checking for a user found message sent from the receiving AP. If there is not a user found message, the CPE slips the Tx time by a predetermined number of PN chips and transmits in the following Next Available Channel (NAC) Tx slot, step 97. The CPE delays the transmit time (SBT) with respect to the receive time (RDW), thereby slipping the PN code phase seen at the AP, and continues transmitting in NAC slots. If step 97 has reached the end of the Tx time frame then the CPE resets the Tx time to the start of the uncertainty, and increases transmit power, step 904, and passes control back to step 95. If a user found message (i.e., AP found a PN code above the threshold and mapped to a CPE ID) is received, step 96, then the CPE again transmits in the next NAC Tx slot a reverse CDMA signal with the forward CDMA signal frequency (see FIG. 2, item 25A) embedded in the reverse CDMA signal, such as shown in FIG. 5B. Step 98 transmits in the next reverse NAC slot and listens to the FOW in the following forward slot. Step 99 looks for a user ID or no message condition from the transmitting AP (FIG. 1, item 12). If a no message condition, then control is passed back to step 98 where the CPE again transmit in the next NAC Tx slot. This loop (98-99) may continue until an ID is received or for a predetermined amount of time before an error condition is flagged (not shown). The next step, 901, compares the received ID with the CPE ID and if a match then the CPE changes to transmit mode as indicated by the AP reverse map, step 902 (FIG. 1, item 101). The CPE then transmits only on the slot(s) indicated in the reverse map. It will be appreciated that the CPE slips the PN code phase, and not the AP.

It will be further appreciated that the reverse acquisition time depends on the frequency of the NAC slots and the size of the PN uncertainty searched (which depends on the range). For example, if the reverse map includes a NAC each burst and the uncertainty is 26 symbols (1664 chips), it will take 416 NACs, or about 0.92 seconds, to sweep the uncertainty. Assuming 4 dB power steps and that the open loop power estimate is within 20 dB, the acquisition would take about 5 seconds. Note that if there were one NAC per 8 bursts, the acquisition would take about 40 seconds. Therefore, in alternate embodiments of this invention an indication of the search range is preferably included periodically in the FOW traffic.

Figure 10:
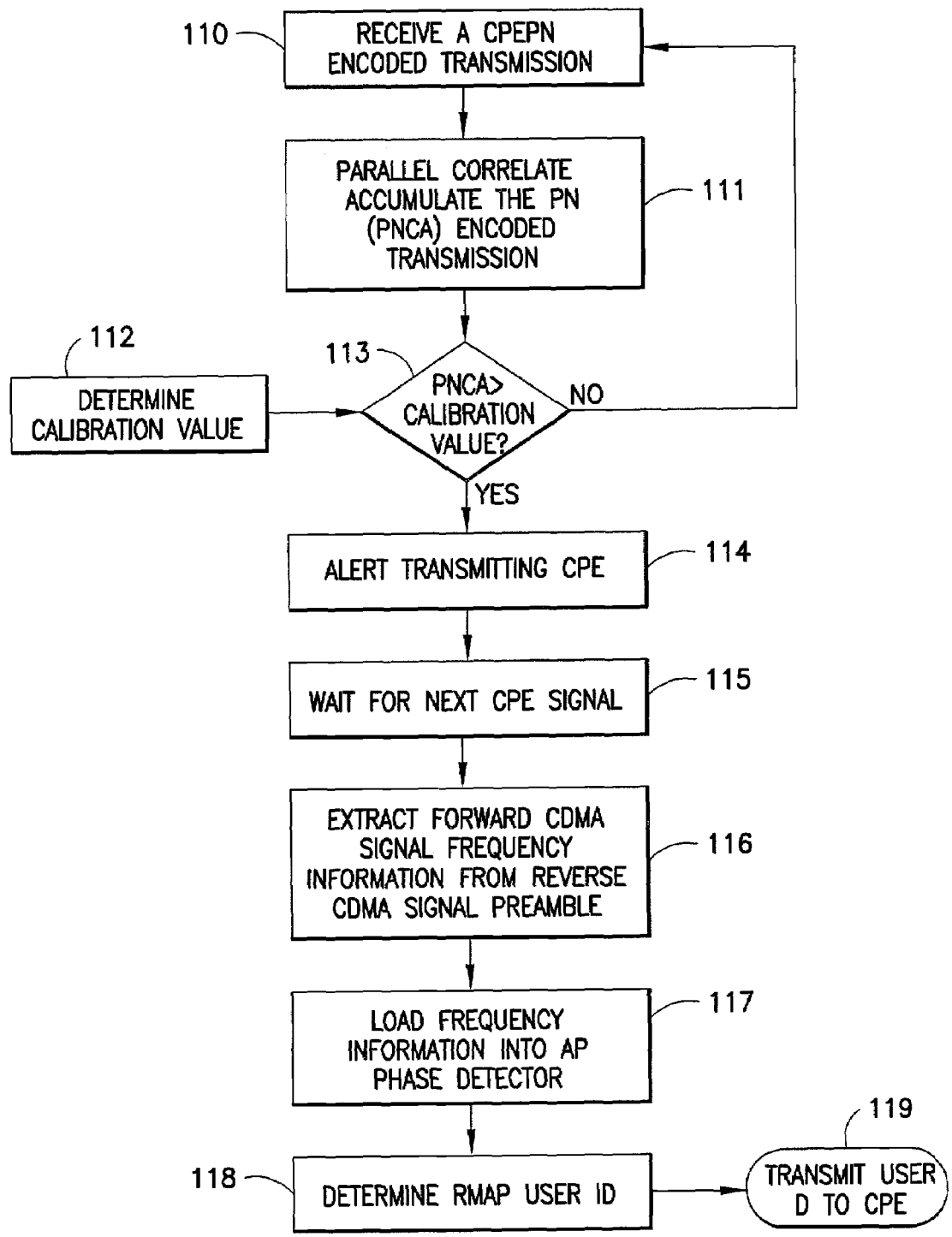
FIG. 10 is a method flow chart illustrating the AP steps for acquisition of the reverse CDMA signal described in FIG. 9.

Referring now to FIG. 10 there is shown a method flow chart illustrating AP steps for acquisition of the reverse CDMA signal described in FIG. 9. Step 110 receives the CPE PN encoded signal transmitted by the CPE 14 during CPE Tx time (See FIG. 5). Step 111 parallel correlates and accumulates the correlations and step 113 compares the accumulated PN correlations with a PN calibration value. It will be appreciated the PN calibration value may be determined by correlating a received PN encoded signal with a PN code not associated with the received PN encoded signal. Step 114 alerts the CPE if the PNCA value has exceeded the calibration value, otherwise step 110 again waits to receive another PN encoded transmission. Once step 114 has alerted the CPE, step 115 waits for the next CPE PN encoded signal sent during a subsequent CPE Tx time (see FIG. 5). Step 116 extracts from the CPE PN encoded signal the forward CDMA signal frequency value (see FIG. 2, step 25A) and step 117 loads this frequency value into a phase detector (FIG. 1, item 102). It will be appreciated that having the frequency already determined by the CPE loaded into the AP phase detector permits the AP to quickly acquire and synchronize with the reverse CDMA signal. Once the reverse CDMA signal has been acquired, step 118 determines from the reverse map a user ID associated with the reverse CDMA signal and transmits this user ID back to the CPE, step 1119. The CPE then compares the user ID as described above and continues to operate in accordance with the AP instructions if the user ID matches the CPE ID.

It will be appreciated that features of the present invention allow an AP to quickly acquire multiple users that are simultaneously attempting reverse acquisition in a CDMA system that includes bandwidth on demand. It will be further appreciated that the AP does not change its timing to align with the CPE but rather forces the CPE to change its timing and power to align with the AP. Thus, the AP only needs to search one uncertainty. After the CPE has acquired a link, the uncertainty can be removed by storing information about the uncertainty and setting CPE power and timing appropriately.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for using power and timing estimates to acquire frame acquisition of a reverse CDMA carrier signal, the method comprising the steps of:
   providing at least one remote transceiver device;
   the at least one remote transceiver device acquiring a forward CDMA carrier signal, wherein the forward CDMA carrier signal comprises at least one PN encoded burst signal;
   the at least one remote transceiver device transmitting a reverse CDMA carrier signal, wherein transmitting the reverse CDMA carrier signal further comprises the steps of:
      modifying a first preamble to remove frequency uncertainty, wherein frequency uncertainty is determined from the forward CDMA carrier signal; and transmitting the reverse CDMA carrier signal at a first power level;
   providing a transceiver base station;
   determining a reverse CDMA carrier signal threshold (RCCST);
   determining if a magnitude of the reverse CDMA carrier signal exceeds the RCCST;
   when, in response to determining that the reverse CDMA carrier signal exceeds the RCCST, using the first preamble to acquire phase of the reverse CDMA carrier signal, and signaling the at least one remote transceiver device to enter a predetermined mode; or
   when, in response to determining that the reverse CDMA carrier signal does not exceed the RCCST, signaling the at least one remote transceiver device to alter its transmission.

2. A method as in claim 1 wherein the step of altering transmission comprises slipping the reverse CDMA carrier signal a predetermined number of chips.

3. A method as in claim 1 wherein the step of altering transmission comprises the step of transmitting the reverse CDMA carrier signal at a second power level.

4. A method as in claim 1, wherein the step of the at least one remote transceiver device acquiring a forward CDMA carrier signal further comprises the steps of:
   providing at least two receiver antennas coupled to the remote transceiver device;
   in response to the at least one remote transceiver receiving at least one first pseudo-noise (PN) encoded burst signal having energy content above a third power level, identifying at least one of the receiver antennas receiving the at least one first PN encoded burst signal, wherein the step of receiving the at least one first pseudo-noise (PN) encoded burst signal having energy content above the third power level further comprises the step of:
      correlating the at least one first PN encoded burst signal with at least one known PN code, wherein the step of correlating further comprises the step of:
         parallel correlating during one of at least three equally spaced accumulation periods associated with the at least one first PN encoded burst signal; and
   frame synchronizing with the at least one first PN encoded burst signal having energy content above the third power level.

5. A method as in claim 4 wherein the step of parallel correlating with at least one parallel correlator further comprises the step of parallel correlating with a length 21 parallel correlator.

6. A method as in claim 4 wherein the at least one known PN code comprises at least fifty-seven known PN codes.

7. A method as in claim 4, wherein the step of frame synchronizing with the at least one first PN encoded burst signal further comprises the steps of:
   determining at least one PN correlation accumulator (PNCA) threshold associated with the at least one first PN encoded burst signal;
   determining at least one sync threshold associated with the at least one first PN encoded burst signal;
   using the at least one PNCA threshold and the at least one sync threshold for searching the at least one first PN encoded burst signal, wherein searching the at least one first PN encoded burst signal further comprises the step of searching the at least one first PN encoded burst signal for a first sync frame;
   determining an estimated forward CDMA carrier signal frequency from the at least one first PN encoded burst signal; and
   determining forward CDMA carrier signal phase from at least one second PN encoded burst signal, wherein the at least one second PN encoded burst signal is associated with the at least one first PN encoded burst signal.

8. A method as in claim 7 wherein the at least one second PN encoded burst signal comprises a PN code substantially similar to the PN code encoding the at least one first PN encoded burst signal.

9. A method as in claim 7 wherein the step of determining the estimated forward CDMA carrier signal frequency further comprises the steps of:
   closing a forward CDMA carrier signal recovery loop in response to finding the first sync frame; and at substantial completion of the at least one first PN encoded burst signal, determining from the forward CDMA carrier signal recovery loop the estimated forward CDMA carrier signal frequency.

10. A method as in claim 9 wherein the step of determining forward CDMA carrier signal phase from the at least one second PN encoded burst signal further comprises the step of modifying a second preamble associated with the at least one second PN encoded burst signal to include the estimated forward CDMA carrier signal frequency.

11. A method as in claim 10 wherein the step of determining forward CDMA carrier signal phase from the at least one second PN encoded burst signal further comprises the steps of:
   loading the estimated forward CDMA carrier signal frequency from the second preamble associated with the at least one second PN encoded burst signal into the forward CDMA carrier signal recovery loop;
   starting from the estimated forward CDMA carrier signal frequency, converging the forward CDMA carrier signal recovery loop frequency with the forward CDMA carrier signal frequency;
   in response to the forward CDMA carrier signal recovery loop frequency converging with the forward CDMA carrier signal frequency, closing a forward CDMA carrier signal phase tracking loop; and
   determining the forward CDMA carrier signal phase from the CDMA carrier signal phase tracking loop.

12. A method as in claim 11 wherein the step of modifying the first preamble to remove frequency uncertainty further comprises the step of modifying the first preamble to include the forward CDMA carrier signal tracking loop frequency substantially converged with the forward CDMA carrier signal frequency.

13. A method as in claim 12 wherein the step of using the first preamble to acquire phase of the reverse CDMA carrier signal further comprises the steps of:
   determining from the first preamble the forward CDMA carrier signal tracking loop frequency;
   loading the forward CDMA carrier signal tracking loop frequency into a reverse CDMA carrier signal recovery loop;
   starting from the forward CDMA carrier signal tracking loop frequency, converging the reverse CDMA carrier signal recovery loop frequency with the forward CDMA carrier signal tracking loop frequency;
   in response to the reverse CDMA carrier signal recovery loop frequency converging with the forward CDMA carrier signal tracking loop frequency, closing a reverse CDMA carrier signal phase tracking loop; and
   determining the reverse CDMA carrier signal phase from the reverse CDMA carrier signal phase tracking loop.

14. A method as in claim 1 wherein the step of determining the threshold further comprises the step of correlating the reverse CDMA carrier signal with a selected PN code that is a PN code known to not be in use by the at least one remote transceiver device.

15. A method as in claim 1 wherein the step of determining if the reverse CDMA carrier signal exceeds the threshold further comprises the step of parallel correlating the reverse CDMA carrier signal with a PN code known to be in use by the at least one remote transceiver device.

16. A method as in claim 1 wherein the step of transmitting the reverse CDMA carrier signal at the first power level further comprises the steps of:
   determining from the forward CDMA carrier signal an estimate of signal to noise ratio (SNR); and
   adjusting the first power level in response to determining the estimate of SNR.

17. A method as in claim 1 wherein the step of signaling the at least one remote transceiver comprises not sending a user found message if the reverse CDMA carrier signal is determined to not exceed the RCCST.

18. A system for reverse acquisition of a reverse CDMA waveform, the system comprising:
   a remote transceiver device comprising:
      at least two receiver antennas for receiving a forward CDMA waveform;
      at least one receiver correlator for correlation of the forward CDMA waveform during one of at least three equally spaced accumulation periods associated with the forward CDMA waveform, and for determining if energy content of the forward CDMA waveform is above a predetermined level;
      a receiver frame synchronizer for synchronizing with the forward CDMA waveform;
      a first preamble modifier for modifying a preamble associated with the reverse CDMA waveform to include a frequency of the forward CDMA waveform acquired by the remote transceiver device;
   a transceiver base station comprising:
      a transmitter calibrator for determining a CDMA carrier signal threshold;
      a transmitter parallel correlator for searching for the reverse CDMA waveform exceeding the CDMA carrier signal threshold;
      a transmitter frame synchronizer for synchronizing with the reverse CDMA waveform exceeding the CDMA carrier signal threshold, the transmitter frame synchronizer comprising:
         a transmitter phase tracking loop for determining a phase of the reverse CDMA waveform, wherein the transmitter phase tracking loop is configured to loading the frequency of the forward CDMA waveform from the modified preamble associated with the reverse CDMA waveform.

19. A system as in claim 18 wherein the at least one receiver correlator further comprises at least one parallel receiver correlator.

20. A system as in claim 19 wherein the at least one parallel receiver correlator further comprises a length 21 parallel receiver correlator, wherein the 21 parallel correlators are separated by a ½ PN chip delay.

21. A system as in claim 18 wherein the at least one receiver correlator further comprises:
   a receiver memory device for the storage of at least one PN code.

22. An system as in claim 21 wherein the receiver memory device for the storage of the at least one PN code further comprises storage for fifty seven PN codes.

23. A system as in claim 18 wherein the receiver frame synchronizer comprises:
   a receiver carrier recovery loop circuit for determining an estimated forward CDMA waveform frequency of the forward CDMA waveform;
   a second receiver preamble modifier for modifying a preamble of the forward CDMA waveform to include the estimated forward CDMA waveform frequency; and
   a receiver phase tracking loop for determining a phase of the forward CDMA waveform, wherein the receiver phase tracking loop is adapted to loading the estimated forward CDMA waveform frequency from the modified preamble of the forward CDMA waveform.

24. A system as in claim 18 wherein the transmitter calibrator for determining the CDMA carrier signal threshold comprises a PN code not associated with the remote transceiver device.

25. A system for acquisition of a reverse CDMA waveform, the system comprising:
a transmitter for transmitting a forward CDMA waveform, wherein each transmitted forward CDMA waveform is associated with a unique PN code, wherein the transmitter comprises:
a first pseudo-noise (PN) correlation accumulator (PNCA) controller for determining a first PNCA threshold from the reverse CDMA waveform;
a first sync controller for determining a first sync threshold associated with the reverse CDMA waveform, and using the first PNCA threshold and the first sync threshold to search for a first burst sync associated with the reverse CDMA waveform; and
a first phase tracking loop for determining the reverse CDMA waveform phase, wherein the first phase tracking loop is adapted to include a frequency of the forward CDMA waveform acquired by the receiver and stored in the reverse CDMA waveform.

26. A system as in claim 25, further comprising a receiver, wherein the receiver comprises:
a plurality of receiver antennas, wherein at least one of the plurality of receiver antennas is adapted to receive the forward CDMA waveform;
a second PNCA controller for determining a second PNCA threshold from the forward CDMA waveform;
a second sync controller for determining a second sync threshold associated with the forward CDMA waveform, and using the second PNCA threshold and the second sync threshold to search for a first burst sync associated with the forward CDMA waveform;
a frequency tracking loop for finding a first signal frequency estimate of the forward CDMA waveform in response to finding the first burst sync; and
a second phase tracking loop for determining signal phase from a second burst, wherein the second burst comprises a second preamble adapted to include the first signal frequency estimate.

27. A system as in claim 26 wherein the second sync controller comprises:
a second sync calibrator for adjusting second sync scale factors and calculating a second sync threshold in response to the at least one of the plurality of receiver antennas adapted
to receive the forward CDMA waveform, wherein the second sync calibrator comprises at least three second parallel sync circuits adapted to search a 1½ chip uncertainty range, each sync circuit comprising:
at least one second sync level circuit;
at least one second sync detect circuit; and
a second sync searcher for aligning burst timing in response to the sync scale factors and second sync threshold determined by the second sync calibrator.

28. A system as in claim 25 wherein the forward CDMA waveform comprises:
at least one QPSK burst data structure, the at least one QPSK burst structure comprising:
a preamble block, wherein the preamble block comprises:
a BPSK frame sync code block;
a payload block, wherein the payload block comprises:
control data;
information data; and
parity data.

29. A system as in claim 28 wherein the at least one CDMA waveform further comprises at least seven QPSK burst data structures.

30. A method for closed-loop acquisition of a reverse CDMA signal, the method comprising the steps of:
initializing a remote transceiver, wherein the step of initializing the remote transceiver further comprises the steps of:
initializing the remote transceiver transmit power;
initializing the remote transceiver transmit time;
transmitting the reverse CDMA signal to a base station, wherein the step of transmitting the reverse CDMA signal to the base station further comprises the steps of:
receiving a forward CDMA signal from the base station;
determining a frequency associated with the forward CDMA signal;
modifying a preamble associated with the reverse CDMA signal to comprise the frequency associated with the forward CDMA signal;
loading the frequency associated with the forward CDMA signal from the preamble associated with the reverse CDMA signal into a phase detector;
determining a phase associated with the reverse CDMA signal; and
acquiring the reverse CDMA signal.

31. A method as in claim 30 wherein the closed-loop acquisition of a reverse CDMA signal further comprises the steps of:
the base station transmitting a user found ID message to the remote transceiver device;
the remote transceiver device comparing the user found ID message with a remote transceiver device ID, and if the user found ID message matches the remote transceiver device ID, then the remote transceiver device transmitting in accordance with instructions from the base station; else
the remote transceiver device delaying the remote transceiver transmit time and/or increasing the remote transceiver transmit power.

* * * * *